(12) United States Patent
Pedersen et al.

(10) Patent No.: US 9,100,868 B2
(45) Date of Patent: Aug. 4, 2015

(54) CHANNEL STATE INFORMATION MEASUREMENT AND REPORTING

(75) Inventors: Klaus Ingemann Pedersen, Aalborg (DK); Timo Erkki Lunttila, Espoo (FI)

(73) Assignee: Cellular Communications Equipment LLC, Plano, TX (US)

( * ) Notice: Subject to any disclaimer, the term of this patent is extended or adjusted under 35 U.S.C. 154(b) by 224 days.

(21) Appl. No.: 13/253,323

(22) Filed: Oct. 5, 2011

(65) Prior Publication Data

US 2012/0093012 A1    Apr. 19, 2012

Related U.S. Application Data

(60) Provisional application No. 61/389,865, filed on Oct. 5, 2010.

(51) Int. Cl.
*H04W 24/10* (2009.01)
*H04W 36/00* (2009.01)
*H04W 72/08* (2009.01)
*H04W 72/04* (2009.01)

(52) U.S. Cl.
CPC .......... *H04W 24/10* (2013.01); *H04W 36/0088* (2013.01); *H04W 72/042* (2013.01); *H04W 72/0413* (2013.01); *H04W 72/082* (2013.01)

(58) Field of Classification Search
USPC ................................. 370/315, 252; 455/509
See application file for complete search history.

(56) References Cited

U.S. PATENT DOCUMENTS

2005/0096062 A1    5/2005    Ji et al. .......................... 455/450
2006/0148411 A1    7/2006    Cho et al. ................... 455/67.13
2008/0253319 A1    10/2008    Ji et al. ........................... 370/328

(Continued)

FOREIGN PATENT DOCUMENTS

CN    1801800 A    7/2006
CN    101635950 A    1/2010

(Continued)

OTHER PUBLICATIONS

3GPP TSG-RAN WG4 AH#10-03, Qualcomm Incorporated, "DL Power Control and Resource Partitioning in Co-Channel Marco and Closed Femto Deployments", (Jun. 28-Jul. 2, 2010), (7 pages), R1-102411.

(Continued)

*Primary Examiner* — Michael Thier
*Assistant Examiner* — Yaotang Wang
(74) *Attorney, Agent, or Firm* — Procopio, Cory, Hargreaves & Savitch LLP

(57) ABSTRACT

A rule specifies a timing relation between a measurement configuration which indicates at least one subframe to measure and a reporting configuration which indicates at least one subframe in which to report. This rule is used by both user equipment UE and network to map between a downlink subframe in which channel state information is measured and an uplink subframe in which the channel state information is reported. The network may configure the UE with the measurement and reporting configurations via dedicated signaling or broadcast. If the measurement configuration is periodic and indicates multiple downlink subframes to measure the rule results in a one to one mapping of downlink to uplink subframe where less than all of the multiple downlink subframes map to an uplink subframe; if aperiodic the rule indicates a single downlink subframe to measure.

21 Claims, 5 Drawing Sheets

(56) References Cited

U.S. PATENT DOCUMENTS

| | | | |
|---|---|---|---|
| 2009/0016312 A1 | 1/2009 | Tao et al. | |
| 2009/0257390 A1* | 10/2009 | Ji et al. | 370/329 |
| 2010/0080139 A1* | 4/2010 | Palanki et al. | 370/252 |
| 2010/0202311 A1 | 8/2010 | Lunttila et al. | 370/252 |
| 2011/0038302 A1* | 2/2011 | Papasakellariou et al. | 370/315 |
| 2011/0141987 A1* | 6/2011 | Nam et al. | 370/329 |
| 2011/0269490 A1* | 11/2011 | Earnshaw et al. | 455/509 |
| 2011/0286346 A1 | 11/2011 | Barbieri et al. | 370/252 |
| 2012/0099462 A1* | 4/2012 | Yuda et al. | 370/252 |

FOREIGN PATENT DOCUMENTS

| | | |
|---|---|---|
| EP | 2408131 A1 | 1/2012 |
| RU | 2364046 C2 | 8/2009 |
| WO | WO-2009129261 A1 | 10/2009 |
| WO | WO-2010089408 A1 | 8/2010 |
| WO | WO 2010103886 A1 | 9/2010 |
| WO | WO 2011/130401 A1 | 10/2011 |

OTHER PUBLICATIONS

3GPP TSG RAN WG1 Meeting #61bis, Ericsson, ST-Ericsson, "Downlink Data Performance with TDM-Based Interference Coordination", (Jun. 28-Jul. 2, 2010), (6 pages), R1-104065.

3GPP TSG-RAN WG1 Meeting #61, MediaTek, Inc., "Views on Joint Time Shifting and Resource Muting Scheme for Co-Channel Marco and Pico eNBs", (Jun. 28-Jul. 2, 2010), (3 pages), R1-103572.

3GPP TSG-RAN WG1 #6 ibis, Qualcomm Incorporated, "Improving Control Reliability in Severe Interference Conditions", (Jun. 28-Jul. 2, 2010), (4 pages), R1-103561.

3GPP TSG-RAN WG1 #6 ibis, Qualcomm Incorporated, "Enabling Communication in Harsh Interference Scenarios", (Jun. 28-Jul. 2, 2010), (11 pages), R1-103560.

3GPP TSG RAN WG1 Meeting #61bis, CATT, "Analysis of Time-Partitioning Solution for Control Channel", (Jun. 28-Jul. 2, 2010), (3 pages), R1-103494.

3GPP TSG-RAN WG1 #60bis, Qualcomm Incorporated, "Measurements and Feedback Extensions for Improved Operations in HetNets", (Apr. 12-16, 2010), (3 pages), R1-102353.

3GPP TSG RAN WG1 Meeting #60bis, Huawei, "Enhanced ICIC and Resource-Specific CQI Measurement", (Apr. 12-16, 2010), (5 pages), R1-101981.

3GPP TS 36.213 V9.2.0 (Jun. 2010), $3^{rd}$ Generation Partnership Project; Technical Specification Group Radio Access Network; Evolved Universal Terrestrial Radio Access (E-UTRA); Physical Layer Procedures (Release 9), (80 pages).

Nokia Siemens Networks et al., 3GPP TSG RAN WG1 #62-bis Meeting, R1-105551, "TDM eICIC coordination between macro eNBs and CSG Home eNBs.", Xi'an, China, Oct. 2010, XP050450654, 6 pages.

Nokia Siemens Networks et al., 3GPP TSG RAN WG4#57 Meeting, R4-104309, "TDM eICIC Patterns for Rel-10 UE measurement restrictions", Jacksonville, USA, Nov. 2010, XP050499494, 4 pages.

TSG-RAN WG1 Meeting #62bis, R1-105779, "Way Forward on time-domain extension of Rel 8/9 backhaul-based ICIC", Xi'an, China, Oct. 2010, XP002669340, 4 pages.

International Search Report for related PCT Application EP2011/072538 mailed Feb. 24, 2012.

Catt, 3GPP TSG RAN WG2 Meeting #71 bis, R2-105335, "Some Potential Impacts of eICIC Time-domain Solutions on UE", Xi'an, China, (Oct. 2010), (2 pages).

Office Action dated Apr. 1, 2015 for related CN Patent Application No. 201180048119.0 in 6 pages.

* cited by examiner

Fig. 3A

Rel-8 CSI timing

| Subframe index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| CSI reporting configuration | | | | | | | | ▓ | | | | | | | | | | ▓ | | | | | | | | | | ▓ | | |
| CSI Measurement | | | | ░ | | | | | | | | | ░ | | | | | | | | | | | ░ | | | | | | |

Fig. 3B eICIC CSI Timing

| Subframe index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| CSI reporting configuration | | | | | | | | ▓ | | | | | | | | | | ▓ | | | | | | | | | | ▓ | | |
| CSI Measurement subframe configuration | ▥ | | ▥ | | | ▥ | | | ▥ | | | ▥ | | | ▥ | | | ▥ | | | ▥ | | | ▥ | | | ▥ | | | |
| CSI Measurement | | | | ░ | | | | | | | | | ░ | | | | | | | | | ░ | | | | | | | | |

CHANNEL STATE INFORMATION MEASUREMENT AND REPORTING

CROSS REFERENCE TO RELATED APPLICATION

This patent application claims priority under 35 U.S.C. §119(e) from Provisional Patent Application No. 61/389,865, filed Oct. 5, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to channel quality/channel state measurement and reporting.

BACKGROUND

The following abbreviations are herewith defined:
3GPP third generation partnership project
CSG closed subscriber group
CSI channel state Information
DL downlink
eNB evolved nodeB (of an LTE system)
eICIC enhanced inter-cell interference coordination
E-UTRAN evolved UTRAN (LTE or 3.9G)
HARQ hybrid automatic repeat request
HeNB home eNB (base station)
LTE long term evolution of 3GPP
LTE-A long term evolution-Advanced
Node B base station or similar network access node
PDCCH physical downlink control channel
RRC radio resource control
TDM time-domain multiplexing (or time division multiple access)
UE user equipment (e.g., mobile equipment/station)
UL uplink
UMTS universal mobile telecommunications system
UTRAN UMTS terrestrial radio access network As the radio spectrum becomes more thoroughly utilized, geographic overlap among different radio networks becomes more prevalent. By example, in the LTE system (and LTE-A) there is the conventional or macro cell whose coverage area overlaps in whole or in part with that of a home network which serves a closed subscriber group CSG. One example of such overlap is shown at FIG. 1: the macro base station is the eNB 12 and the home base station is the HeNB 13. Three mobile devices are shown, in which UE 10-1 and 10-3 are under control of the eNB 12 and UE 10-2 is under control of the HeNB 13. Whereas the dashed line coverage area of the HeNB 13 is shown as being fully enveloped within the coverage area of the eNB 12 (the entirety of FIG. 1), it will be recognized that some deployments may exhibit only a partial overlap. As used further herein, the term eNB refers to the macro access node and the home access node will be specified as such to distinguish the two.

In the particular arrangement of HeNBs in the LTE system as well as similarly overlapping cells in other radio technologies, radio channels may be shared which gives rise to co-channel interference among the various UL and DL signals from the different but closely located radios. In LTE and LTE-A there is time-domain (TDM) enhanced inter-cell interference coordination (eICIC) which is applied between the eNBs and the HeNBs to reduce the co-channel interference between cells. For such cases it is also beneficial to optimize the channel state information (CSI) which the various UEs report on the UL to their respective access nodes, which enables the aforementioned TDM eICIC to also be optimized.

The TDM eICIC concept for LTE (and LTE-A) rests on the proposition that the HeNB 13 is only allowed to transmit in a sub-set of all DL subframes FIG. 2 is a table of DL subframes for the eNB and the HeNB which gives an example of the principle. The eNB is not restricted in which DL subframes it may transmit which is indicated by all DL subframes being shaded in FIG. 2 at the macro layer. The HeNB is restricted and is allowed to transmit only in the subset of DL subframes shaded in FIG. 2 for the HeNB layer, specifically subframes 1 through 4. At FIG. 2 subframes 5 through 8 are unshaded for the HeNB layer meaning they are almost blank. In this context, "almost blank" refers to cases with nearly no transmission from the HeNB and its transmissions are highly restricted (e.g., multi-media broadcast over a single frequency MBSFN is allowed in those DL subframes). In concept, the macro-UEs (under control of the eNB, perhaps those not allowed to connect CSG HeNB) which are close to the HeNB shall be scheduled during the time-periods with almost blank sub-frames from the HeNBs. By example, this means the eNB 12 should schedule UE 10-1 in any of subframes 5 through 8, which avoids that UE's DL signal from being exposed to too high interference. Other macro-UEs such as UE 10-3 could also be scheduled by the eNB 12 in other sub-frames.

For the TDM eICIC to operate properly, it is in generally assumed that the eNBs know in which sub-frames the HeNBs are muted. There has also been proposals in 3GPP discussions that the eNB signal to its own UEs which sub-frames are almost blanked (and therefore in possible use by the HeNBs).

The eICIC concept gives rise to several unresolved problems. First, for macro-UEs which are operating close to a non-allowed CSG HeNB such as UE 10-1 of FIG. 1, the CSI this UE reports on the UL to its eNB 12 will be significantly different depending on whether the reported CSI is measured during time-periods with almost blank sub-frames from HeNBs, or in other sub-frames. Second, in general the eNB 12 does not know the exact location of the UEs under its control, and so to adopt the scheduling for UE 10-1 noted by example above the eNB 12 must estimate its geographic location in order to determine whether or not it is close to some CSG HeNB 13 which it is not allowed to join.

There have been a few proposals to the 3GPP concerning CSI for TDM eICIC. Document R1-102353 entitled "Measurements and feedback extensions for improved operations in HetNets", by Qualcomm (3GPP TSG-RAN WG1 #60 bis; 12-16 Apr. 2010; Beijing, China) proposes that the UE performs measurement on a set of subframes which the network signals, and that channel feedback is restricted to a single subframe. Limiting the feedback measurements to some specific subframes (e.g. either normal or almost blank) is intended to provide better feedback accuracy corresponding more directly to the TDM eICIC scheme in use. This appears to follow the CSI regimen for LTE Rel-8/9 which is specified in 3GPP TS36.213 v9.2.0 (2010 June). Specifically, the CSI reference resource is always a single subframe and the CSI is reported in an UL subframe spaced a fixed distance from the subframe which was measured, following the general HARQ timing (i.e. CSI measured in subframe n is transmitted in the UL subframe n+4).

Document R1-101981 entitled "Enhanced ICIC and Resource-Specific CQI Measurement", by Huawei (3GPP TSG-RAN WG1 #60 bis; 12-16 Apr. 2010; Beijing, China)

discusses a time/resource-specific CSI measurement, which limits the CQI averaging to some specific subframes depending on the network deployment model (e.g. HetNet). In practice this averaging appears quite problematic for the UE as it increases battery consumption and complicates memory handling since the measurements need to be buffered for multiple subframes.

SUMMARY

In a first exemplary aspect of the invention there is a method comprising: storing in a local memory a rule that specifies a timing relation between a measurement configuration which indicates at least one subframe to measure and a reporting configuration which indicates at least one subframe in which to report; and using the rule to map between a downlink subframe in which channel state information is measured and an uplink subframe in which the channel state information is reported.

In a second exemplary aspect of the invention there is an apparatus comprising at least one processor and at least one memory. The at least one memory includes computer program code and a rule that specifies a timing relation between a measurement configuration which indicates at least one subframe to measure and a reporting configuration which indicates at least one subframe in which to report. The at least one memory and the computer program code are configured with the at least one processor to cause the apparatus at least to perform: using the rule to map between a downlink subframe in which channel state information is measured and an uplink subframe in which the channel state information is reported.

In a third exemplary aspect of the invention there is a computer readable memory storing a rule that specifies a timing relation between a measurement configuration which indicates at least one subframe to measure and a reporting configuration which indicates at least one subframe in which to report. The computer readable memory also stores a program of computer readable instructions that when executed by a processor result in actions comprising: using the rule to map between a downlink subframe in which channel state information is measured and an uplink subframe in which the channel state information is reported.

In a fourth exemplary aspect of the invention there is an apparatus comprising storing means and processing means. The storing means is for storing a rule that specifies a timing relation between a measurement configuration which indicates at least one subframe to measure and a reporting configuration which indicates at least one subframe in which to report. The processing means is for using the rule to map between a downlink subframe in which channel state information is measured and an uplink subframe in which the channel state information is reported.

BRIEF DESCRIPTION OF THE DRAWINGS

The foregoing and other aspects of the exemplary embodiments of this invention are made more evident in the following Detailed Description, when read in conjunction with the attached Drawing Figures.

FIG. 3A is a timing diagram showing CSI related subframes set forth in LTE Release 8.

FIG. 3B is a timing diagram showing DL subframes in which CSI is measured and UL subframes in which the measured CSI is reported according to an exemplary embodiment of the invention.

DETAILED DESCRIPTION

Though not limited thereto, embodiments of this invention are particularly advantageous for use in an LTE and LTE-A systems, and concern mapping between subframes in which the UE measures CSI and subframes in which the UE sends measured CSI to the eNB. In LTE/LTE-A and also in certain other radio technologies it is the network which directs the UE which subframes to measure, and there is a mapping between the subframe being measured and the subframe in which the measurements are reported. Both the UE and the network use the same mapping though perhaps in reverse order, and therefore embodiments of these teachings apply to both the UE and to the eNB. While the concept is described with reference to LTE and/or LTE-A, such description is by example only and not a limitation; these teachings may be readily extended to other communication systems other than E-UTRAN.

Figure 1:
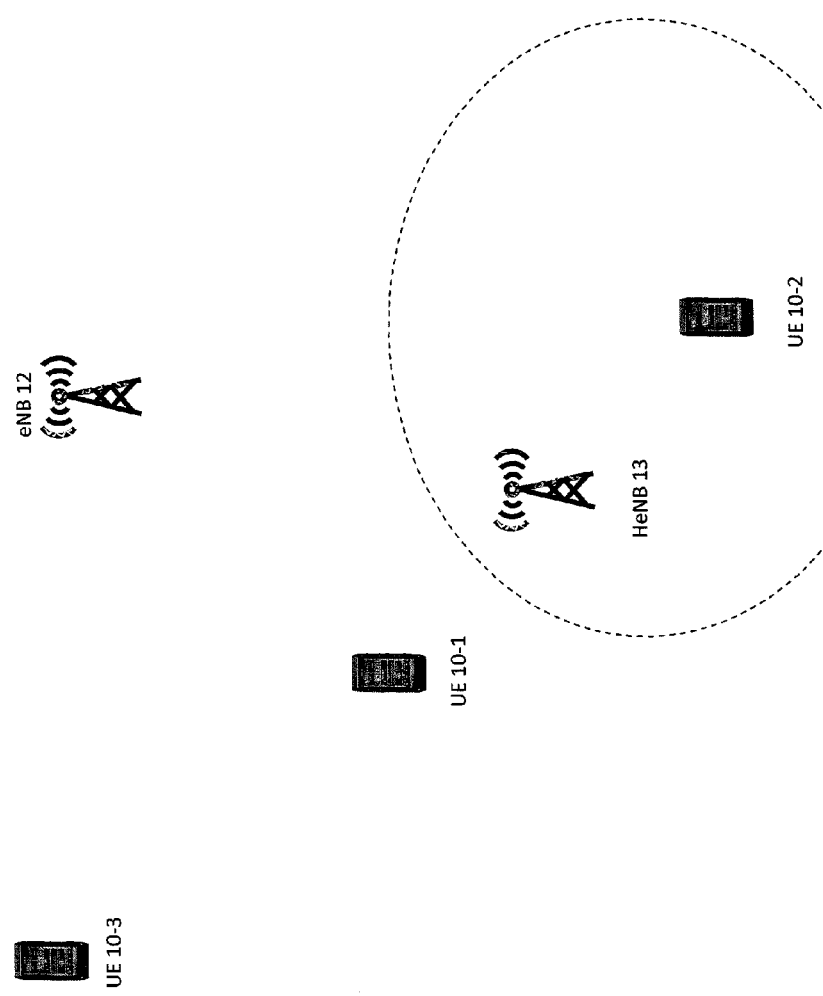
FIG. 1 is a schematic diagram showing a macro eNB cell and a CSG home eNB cell which are subject to co-channel interference and which is an environment in which exemplary embodiments of the invention may be advantageously practiced.
Figure 2:
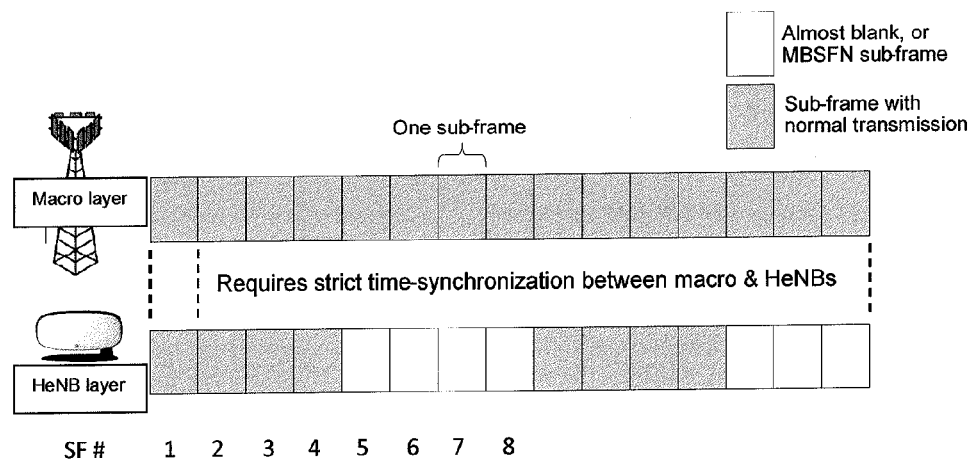
FIG. 2 is a timing diagram of downlink subframes for a macro eNB and a CSG Home eNB and illustrating an inter-cell interference mitigation scheme relevant to certain exemplary embodiments of the invention.

Particularly for the exemplary environment shown at FIG. 1, often the network would prefer to distinguish the CSI reported to it between the almost blank subframes and the other subframes which are not almost blank. For optimal scheduling and link adaptation it would be beneficial for the network to control in which sub-frames CSI is measured. Since in different situations the network might want CSI for either the almost blanked subframes or for the other subframes, exemplary embodiments of the invention are flexible enough to enable the eNB to schedule CSI to be measured for either.

In exemplary embodiments of the invention the network signals to the UE a CSI reporting configuration, which may be for periodic CSI reporting or for aperiodic CSI reporting. The CSI reporting configuration tells the UE in which UL subframe(s) to report its CSI measurement(s).

In addition to this the network also signals the UE with a "CSI measurement subframe configuration" which indicates the subframes in which the UE should measure CSI. This configuration could also be periodic or aperiodic, and by example it may be signaled via dedicated RRC signaling or via non-dedicated broadcast. By example the periodic CSI measurement subframe configuration may include parameters such as periodicity and subframe offset. By example the aperiodic CSI measurement subframe configuration may be a bitmap indicating in which subframes the UE should measure CSI. Similarly the periodic CSI measurement subframe configuration may be signaled as a bitmap indicting which subframe(s) of a radio frame the UE is to measure CSI, and also including an indication that the configuration is periodic. In an embodiment the eNB has the flexibility to configure a particular UE with multiple CSI measurement subframe configurations simultaneously.

In addition to the CSI reporting configuration and the CSI measurement subframe configuration, there is also rule that ties a given CSI measurement subframe configuration to a specific CSI reporting configuration by giving an unambiguous timing relation between their DL and UL subframes. In a specific embodiment such a rule is summarized below:

The UE shall perform the CSI measurements in the subframes indicated by the CSI measurement subframe configuration.

In the subframes indicated by CSI reporting configuration the UE shall report the CSI measured in the most recent subframe (that with the largest subframe index) indicated by the CSI measurement subframe configuration satisfying the condition:

$$N_{CSI\text{-}meas} \leq N_{CSI\text{-}report} - t_{proc};$$

where $N_{CSI\text{-}meas}$ is the index of the CSI measurement subframe.
$N_{CSI\text{-}report}$ is the index of the CSI reporting subframe.
$t_{proc}$ is the minimum processing time allowed for the UE to process the measurement.

The timing diagram of FIG. 3A illustrates CSI related timing for LTE Release 8. The CSI reference resource is the DL subframe which the UE measures, and the UE sends that measured CSI in the UL subframe spaced always four subframes after the DL CSI reference resource. Specifically, assume the eNB tasks the UE to measure CSI in each $10^{th}$ subframe beginning at subframe index #3. At FIG. 3A the UE reports in UL subframe index 7 the CSI it measured at DL subframe index #3; reports in UL subframe index 17 the CSI it measured at DL subframe index #13; and so forth. There is no specific signaling by the eNB of which UL subframe the UE is to report because the wireless standard stipulates the mapping is always UL=DL+4, and both UE and eNB know that fixed mapping. Spacing of four subframes is used to allow the UE sufficient time to process the measured DL results and compile them into the message to be sent on the UL.

The timing diagram of FIG. 3B illustrates CSI related timing according to an exemplary embodiment of the invention for periodic CSI reporting. For FIG. 3B assume that the eNB configures the UE with a CSI measurement subframe configuration having parameters periodicity=3 and an offset such that the UE sets its first DL subframe to measure CSI as index #0 of FIG. 3B. This CSI measurement subframe configuration designates subframe indices 0, 3, 6, 9, 12, etc. as CSI measurement subframes for the UE as shown by shading in the row CSI measurement subframe configuration at FIG. 3B. Assume further for FIG. 3B that the eNB configures the UE with a CSI reporting configuration having parameters periodicity=10 and an offset such that the UE sets its first UL subframe to report CSI as index #7 of FIG. 3B. If we further assume the processing delay $t_{proc}$ of the above rule is 3 or 4 subframes, then the designated UL subframes for CSI reporting are subframe indices 7, 17, 27, etc. for the UE as shown by shading in the row CSI reporting configuration at FIG. 3B.

By the exemplary rule set forth above, the UE reports in the designated UL subframes only the CSI that it measures in the subframes that are shaded in the row CSI measurement of FIG. 3B. Specifically, the UE reports in UL subframe index 7 the CSI it measured at DL subframe index #3; reports in UL subframe index 17 the CSI it measured at DL subframe index #12; and reports in UL subframe index 27 the CSI it measured at DL subframe index #21. Designated CSI measurement subframes 0, 6, 9, 15, 18 and 24 do not meet the criteria set forth at the example rule above, and since the UE knows the rule and the UL reporting subframes in advance in one exemplary embodiment the UE need not even measure CSI in those subframes. In another exemplary embodiment the wireless standard which mandates UE behavior according to these teachings may require the UE to measure CSI in those subframes anyway (e.g., the UE is directed to measure CSI in all subframes designated by the CSI measurement subframe configuration). This is in case the eNB sends a new (aperiodic) CSI reporting configuration which would trigger a report of the CSI from one of those other subframes.

Using the CSI measurement subframe configuration and the periodic CSI reporting configuration the eNB could task the UE to measure and report only almost blank subframes, or the other subframes, or some combination of them in separate reporting instances as the eNB/network sees fit for its needs.

The aperiodic reporting embodiments follow similar to the above described periodic reporting example, except there is no repeated measuring and reporting from the signaled configurations. As noted above with the periodic reporting example the UE may perform CSI measurements in advance of the aperiodic CSI reporting configuration, just in case the eNB does send an aperiodic CSI report request.

In an exemplary aperiodic embodiment the definition of the LTE Release 8/9 aperiodic CSI reporting can be extended so that the network can request CSI that is measured either during time-periods where HeNBs are almost muted, or during other sub-frames. This implies that when the eNB requests an aperiodic (scheduled) CSI, the request which in this case is sent via the PDCCH grant of UL resources should include information on which CSI measurement subframe configuration the report should correspond to.

In exemplary embodiments both the UE and the macro eNB implement aspects of the invention for they both store in their local memories the rule and the measurement and reporting configurations which are valid for that specific UE at a given time. Specific implementations have the rule mapping one DL measurement subframe to one and only one UL reporting subframe, as in the above example. Those DL measurement subframes which do not map are not in these exemplary embodiments used to average a result which is then reported because in these specific embodiments the macro eNB 12 disaggregates CSI measured on the almost blank subframes from CSI measured on the other subframes by having CSI of only one DL subframe reported in only one UL subframe. Other implementations may use an averaging in select instances, different from the specific examples above.

On technical effect is that the exemplary embodiments detailed above enable the network to take full advantage of TDM eICIC by facilitating appropriate scheduling of macro-UEs according to a more precise view of their respective DL channel quality. Another technical effect of having the CSI resource specific sub-frame configuration as in these exemplary embodiments is that the macro eNB is enabled to more accurately estimate whether a macro UE shall be restricted to being scheduled only during sub-frames with HeNB muting, or whether it is also feasible to schedule it in other sub-frames. This technical effect is present even without the macro eNB knowing the geographic location of that macro UE.

Figure 4:
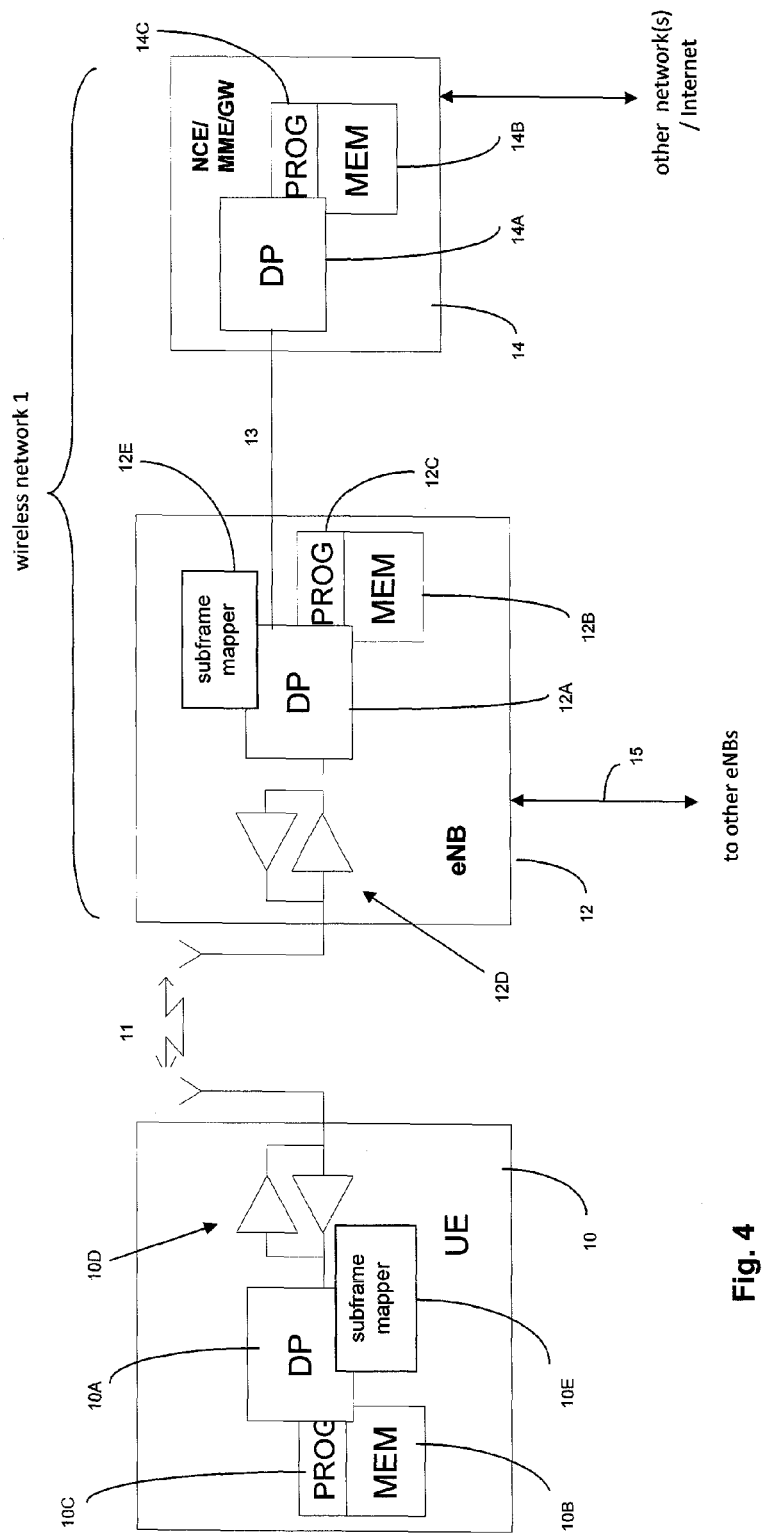
FIG. 4 is a simplified block diagram of various electronic devices that are suitable for use in practicing the exemplary embodiments of this invention.

Reference is now made to FIG. 4 for illustrating a simplified block diagram of various electronic devices that are suitable for use in practicing the exemplary embodiments of this invention. In FIG. 4 a wireless network 1 is adapted for communication with a UE 10 via a node B (e.g., base station or macro-eNB) 12. The network 1 may include a higher controlling node generically shown as a gateway GW 14, which may be referred to variously as a radio network controller RNC, a mobility management entity MME, or a system architecture evolution gateway SAE-GW. The GW 14 represents a node higher in the network than the eNB 12 and in certain embodiments the signaling detailed herein is independent of that GW 14, except to the extent the eNB 12 may sometimes pass certain CSI information it receives from the UE 10 to the GW 14.

The UE 10 includes a data processor (DP) 10A, a memory (MEM) 10B that stores a program (PROG) 10C, and a suitable radio frequency (RF) transmitter and receiver 10D for bidirectional wireless communications with the eNB 12, which also includes a DP 12A, a MEM 12B that stores a PROG 12C, and a suitable RF transmitter and receiver 12D. The eNB 12 may be coupled via a data path 13 (e.g., Iub or S1) to the serving or other GW 14. The eNB 12 and the UE 10 communicate over a wireless link 11, each using one or more antennas (one antenna shown for each). In an embodiment, the wireless link 11 is a physical downlink control channel such as PDCCH and the uplink is a physical uplink shared channel such as the PUSCH. At least one of the PROGs 10C and 12C is assumed to include program instructions that, when executed by the associated DP, enable the electronic device to operate in accordance with the exemplary embodiments of this invention, as discussed below in greater detail.

Within the UE 10, either separate from or within the DP 10A, is a subframe mapper 10E that uses the rule and the configurations stored in the MEM 10B to map between the DL subframe which the UE measures CSI to the UL subframe in which the UE reports the measured CSI. Also within the eNB 12, either separate from or within the DP 12A, is a subframe mapper 12E that uses the rule and the configurations stored in the MEM 12B to map between the measuring DL and reporting UL subframes mentioned above. Further, within each device 10, 12, 14 is a modem; for the UE 10 and eNB 12 such a modem is embodied within the respective transmitter/receiver 10D, 12D, and is embodied within the DP 12A, 14A of the respective eNB 12 and GW 14 for communicating over the data link 13 between them.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the PROGs 10C, 12C and 14C is assumed to include program instructions that, when executed by the associated DP, enable the electronic device to operate in accordance with the exemplary embodiments of this invention. Inherent in the DPs 10A, 12A is a clock to enable synchronism among the various devices for transmissions and receptions within the appropriate time intervals and slots required.

In general, the exemplary embodiments of this invention may be implemented by computer software PROGs 10C, 12C, 14C embodied on the respective memories MEMs 10B, 12B, 14C and executable by the respective DPs 10A, 12A, 14A of the UE 10, eNB 12 and GW 14, or by hardware, or by a combination of software and/or firmware and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

For the aspects of this invention related to the network/eNB, embodiments of this invention may be implemented by computer software executable by a data processor of the Node B 12, such as the processor 12A shown, or by hardware, or by a combination of software and hardware. For the aspects of this invention related to the UE, embodiments of this invention may be implemented by computer software executable by a data processor of the UE 10, such as the processor 10A shown, or by hardware, or by a combination of software and hardware. Further in this regard it should be noted that the various logical step descriptions above and at FIG. 5 below may represent program steps, or interconnected logic circuits, blocks and functions, or a combination of program steps and logic circuits, blocks and functions.

Further details and implementations are described particularly below with reference to FIG. 5. Exemplary embodiments of this invention encompass a method; an apparatus that includes a processor, memory, transmitter and receiver; and a memory embodying a computer program; that at block 502 stores in a local memory a rule that specifies a timing relation between a measurement configuration which indicates at least one subframe to measure and a reporting configuration which indicates at least one subframe in which to report; and at block 504 uses the rule to map between a downlink subframe in which channel state information is measured and an uplink subframe in which the channel state information is reported.

Figure 5:
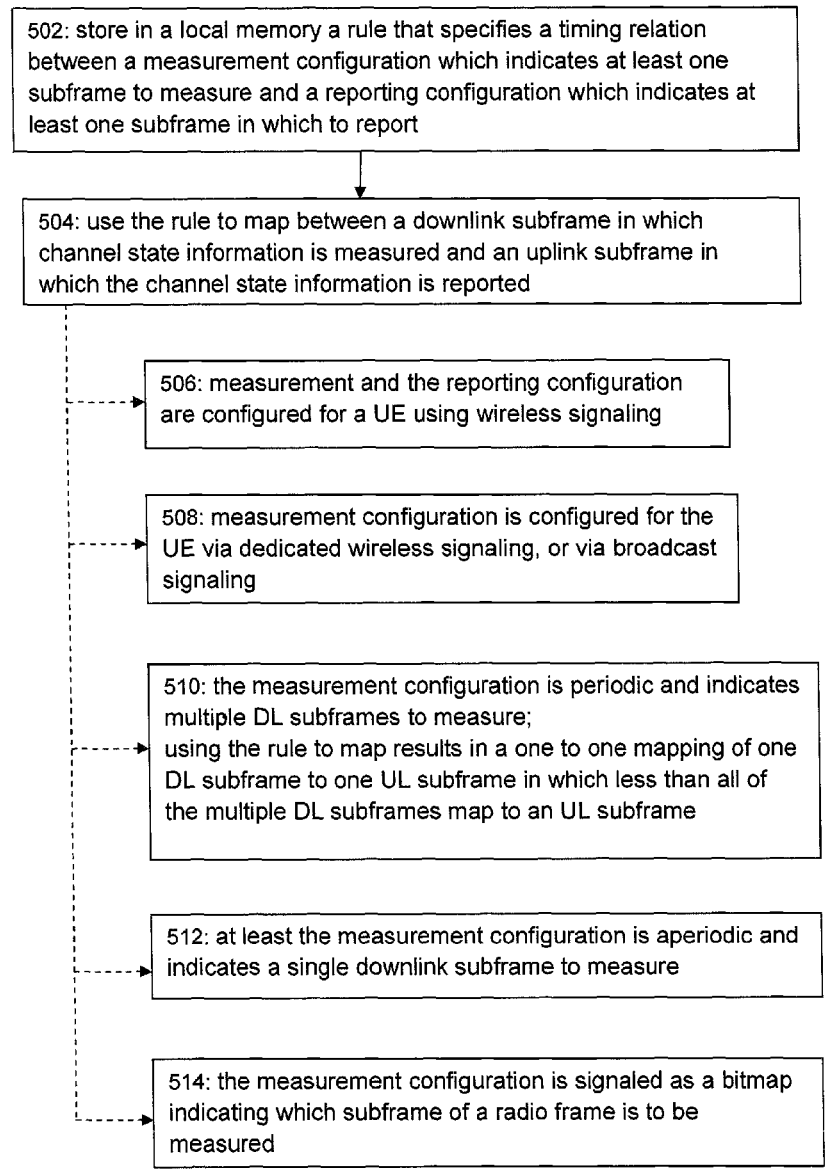
FIG. 5 is a logical flow diagram that illustrates the operation of a method, and result of execution of computer program instructions embodied on a computer readable memory, in accordance with the exemplary embodiments of this invention.

Optional blocks are shown by dashed lines at FIG. 5. At block 506 is shown that the measurement configuration and the reporting configuration are configured for a user equipment using wireless signaling. At block 508 are shown the two different options of at least the measurement configuration being configured for the user equipment via dedicated wireless signaling or via broadcast signaling.

Block 510 is from the specific example above; the measurement configuration is periodic and indicates multiple downlink subframes to measure and using the rule to map between the downlink subframe and the uplink subframe results in a one to one mapping of one downlink subframe to one uplink subframe in which less than all of the multiple downlink subframes map to an uplink subframe. The alternative to block 510 is at block 512, in which at least the measurement configuration is aperiodic and indicates a single downlink subframe to measure. For either periodic or aperiodic, block 514 shows the particular embodiment in which the measurement configuration of block 502 is signaled to the UE as a bitmap indicating which subframe(s) of a plurality of subframes to measure. By example the bitmap may indicate which subframe(s) of a radio frame are to be measured. In LTE there are ten subframes in one radio frame.

Note that blocks 502 and 504 may be executed by a network access node macro-eNB, which sends to the UE the measurement configuration and the reporting configuration, and uses the rule at block 504 by mapping between an uplink subframe in which the channel state information is received from the user equipment and a downlink subframe indicated by the measurement configuration. In another embodiment blocks 502 and 504 are executed by the user equipment which receives from a network the measurement configuration and the reporting configuration, and which uses the rule of block 504 by mapping between a downlink subframe indicated by the measurement configuration in which the user equipment measures channel state information and an uplink subframe in which the user equipment reports the measured channel state information to the network.

An embodiment of the invention may be an apparatus comprising at least one processor, and at least one memory including computer program code and a rule that specifies a timing relation between a measurement configuration which indicates at least one subframe to measure and a reporting configuration which indicates at least one subframe in which to report. In such an embodiment the at least one memory and the computer program code configured, with the at least one processor, to cause the apparatus at least to perform using the rule to map between a downlink subframe in which channel state information is measured and an uplink subframe in which the channel state information is reported. Such an apparatus may also be configured to perform the optional steps at block 5.

Another embodiment is an apparatus comprising storing means for storing a rule that specifies a timing relation between a measurement configuration which indicates at least one subframe to measure and a reporting configuration which indicates at least one subframe in which to report; and processing means for using the rule to map between a downlink subframe in which channel state information is measured and an uplink subframe in which the channel state information is reported. Such an apparatus may also be configured to perform the optional steps at block 5.

In general, the various exemplary embodiments may be implemented in hardware or special purpose circuits, software, logic or any combination thereof. As such, it should be appreciated that at least some aspects of the exemplary embodiments of the inventions may be practiced in various components such as integrated circuit chips and modules.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

We claim:

1. A method comprising:
    storing in a local memory a rule that specifies a timing relation between a measurement configuration which indicates at least one subframe to measure and a reporting configuration which indicates at least one subframe in which to report; and
    using the rule to map between a downlink subframe in which channel state information is measured and an uplink subframe in which the channel state information is reported,
        wherein at least the measurement configuration is periodic and indicates multiple downlink subframes to measure, and
        wherein using the rule to map between the downlink subframe and the uplink subframe results in a one to one mapping of one downlink subframe to one uplink subframe in which less than all of the multiple downlink subframes map to an uplink subframe.

2. The method according to claim 1, wherein the measurement configuration and the reporting configuration are configured for a user equipment using wireless signaling.

3. The method according to claim 2, wherein at least the measurement configuration is configured for the user equipment via dedicated wireless signaling.

4. The method according to claim 2, wherein at least the measurement configuration is configured for the user equipment via broadcast signaling.

5. The method according to claim 2, wherein the signaled measurement configuration comprises a bitmap which indicates which of a plurality of subframes is the at least one subframe to measure.

6. The method according to claim 1, in which the method is executed by a network access node which sends to a user equipment the measurement configuration and the reporting configuration; and in which using the rule comprises mapping between an uplink subframe in which the channel state information is received from the user equipment and a downlink subframe indicated by the measurement configuration.

7. The method according to claim 1, in which the method is executed by a user equipment which receives from a network the measurement configuration and the reporting configuration; and in which using the rule comprises mapping between a downlink subframe indicated by the measurement configuration in which the user equipment measures channel state information and an uplink subframe in which the user equipment reports the measured channel state information to the network.

8. An apparatus comprising:
    at least one processor; and
    at least one memory including computer program code and a rule that specifies a timing relation between a measurement configuration which indicates at least one subframe to measure and a reporting configuration which indicates at least one subframe in which to report;

the at least one memory and the computer program code configured, with the at least one processor, to cause the apparatus at least to perform:

using the rule to map between a downlink subframe in which channel state information is measured and an uplink subframe in which the channel state information is reported, wherein at least the measurement configuration is periodic and indicates multiple downlink subframes to measure, and wherein using the rule to map between the downlink subframe and the uplink subframe results in a one to one mapping of one downlink subframe to one uplink subframe in which less than all of the multiple downlink subframes map to an uplink subframe.

9. The apparatus according to claim 8, wherein the measurement configuration and the reporting configuration are configured for a user equipment using wireless signaling.

10. The apparatus according to claim 9, wherein at least the measurement configuration is configured for the user equipment via dedicated wireless signaling.

11. The apparatus according to claim 9, wherein at least the measurement configuration is configured for the user equipment via broadcast signaling.

12. The apparatus according to claim 9, wherein the signaled measurement configuration comprises a bitmap which indicates which of a plurality of subframes is the at least one subframe to measure.

13. The apparatus according to claim 8, in which the apparatus comprises a network access node which is configured to send to a user equipment the measurement configuration and the reporting configuration; and in which using the rule comprises mapping between an uplink subframe in which the channel state information is received from the user equipment and a downlink subframe indicated by the measurement configuration.

14. The apparatus according to claim 8, in which the apparatus comprises a user equipment which receives from a network the measurement configuration and the reporting configuration; and in which using the rule comprises mapping between a downlink subframe indicated by the measurement configuration in which the user equipment measures channel state information and an uplink subframe in which the user equipment reports the measured channel state information to the network.

15. A non-transitory computer readable memory storing a rule that specifies a timing relation between a measurement configuration which indicates at least one subframe to measure and a reporting configuration which indicates at least one subframe in which to report, and storing a program of computer readable instructions that when executed by a processor result in actions comprising:

using the rule to map between a downlink subframe in which channel state information is measured and an uplink subframe in which the channel state information is reported, wherein at least the measurement configuration is periodic and indicates multiple downlink subframes to measure, and wherein using the rule to map between the downlink subframe and the uplink subframe results in a one to one mapping of one downlink subframe to one uplink subframe in which less than all of the multiple downlink subframes map to an uplink subframe.

16. The non-transitory computer readable memory according to claim 15, wherein the measurement configuration and the reporting configuration are configured for a user equipment using wireless signaling.

17. The non-transitory computer readable memory according to claim 16, wherein at least the measurement configuration is configured for the user equipment via dedicated wireless signaling.

18. The non-transitory computer readable memory according to claim 16, wherein at least the measurement configuration is configured for the user equipment via broadcast signaling.

19. The non-transitory computer readable memory according to claim 16, wherein the signaled measurement configuration comprises a bitmap which indicates which of a plurality of subframes is the at least one subframe to measure.

20. The non-transitory computer readable memory according to claim 15, in which the actions are executed by a network access node, which sends to a user equipment the measurement configuration and the reporting configuration, and in which using the rule comprises mapping between an uplink subframe in which the channel state information is received from the user equipment and a downlink subframe indicated by the measurement configuration.

21. The non-transitory computer readable memory according to claim 15, in which the actions are executed by a user equipment, which receives from a network the measurement configuration and the reporting configuration, and in which using the rule comprises mapping between a downlink subframe indicated by the measurement configuration in which the user equipment measures channel state information and an uplink subframe in which the user equipment reports the measured channel state information to the network.

* * * * *